(12) United States Patent
Mandry et al.

(10) Patent No.: US 6,389,211 B1
(45) Date of Patent: May 14, 2002

(54) FIBER OPTIC CABLE STORAGE DEVICE

(75) Inventors: Michael A. Mandry, Frisco; Denise L. Smart, Plano, both of TX (US)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 09/590,841

(22) Filed: Jun. 9, 2000

(51) Int. Cl.[7] ................................................. G02B 6/44
(52) U.S. Cl. ...................................... 385/135; 385/134
(58) Field of Search ............................... 385/134–137; 174/68.3, 95, 135, 72 A; 361/826

(56) References Cited

U.S. PATENT DOCUMENTS

| | | | |
|---|---|---|---|
| 4,696,438 A | 9/1987 | Myers | 242/118.41 |
| 4,783,954 A | 11/1988 | Akre | 57/9 |
| 4,792,203 A | 12/1988 | Nelson et al. | 350/96.2 |
| 4,995,688 A | 2/1991 | Anton et al. | 350/96.1 |
| 5,013,121 A | 5/1991 | Anton et al. | 350/96.2 |
| 5,066,149 A | 11/1991 | Wheeler et al. | 385/135 |
| 5,067,678 A | 11/1991 | Henneberger | 248/68.1 |
| 5,179,618 A | 1/1993 | Anton | 385/136 |
| 5,208,894 A | 5/1993 | Johnson et al. | 385/135 |
| 5,214,735 A | 5/1993 | Henneberger et al. | 385/136 |
| 5,287,426 A | 2/1994 | Shahid | 385/85 |
| 5,301,884 A | 4/1994 | Horneman | 242/7.09 |
| 5,316,243 A | 5/1994 | Henneberger et al. | 248/68.1 |
| 5,339,379 A | 8/1994 | Kutsch et al. | 385/135 |
| 5,497,444 A | 3/1996 | Wheeler | 385/135 |
| 5,703,990 A * | 12/1997 | Robertson et al. | 385/135 |
| 5,717,810 A | 2/1998 | Wheeler | 385/135 |
| 5,758,003 A | 5/1998 | Wheeler et al. | 385/134 |
| 5,761,368 A | 6/1998 | Arnett et al. | 385/134 |
| 5,802,237 A * | 9/1998 | Pulido | 385/135 |
| 5,915,062 A | 6/1999 | Jackson et al. | 385/137 |
| 5,946,440 A | 8/1999 | Puetz | 385/135 |
| 5,999,668 A * | 12/1999 | Hernandez et al. | 385/12 |
| 6,192,180 B1 * | 2/2001 | Kim et al. | 385/135 |

* cited by examiner

Primary Examiner—Brian Sircus
Assistant Examiner—Michael C. Zarroli
(74) Attorney, Agent, or Firm—Skjerven Morrill Macpherson LLP; David G. Dolezal (57) ABSTRACT

A cable storing apparatus including a device for storing communications cable such as fiber optic cable. The device includes a plurality of cable guide structures located on a panel. The cable guide structures define a plurality of cable storage pathways positioned in an outward progression from a hub. The cable can be individually stored in each cable storage pathway. In one example the cable guide structures include discontinuous wall structures with radial cable entry gaps for allowing cable to enter the cable storage pathways. The cable guide structures may also include posts located in the radial cable entry gaps for defining portions of the cable storage pathways and portions of the cable entry pathways leading towards the cable storage pathways. In one example, the cable storage pathways encircle the hub. The cable storage device can be implemented with an add-on structure utilized for shipment and installation of a fiber optic carrier.

58 Claims, 6 Drawing Sheets

FIBER OPTIC CABLE STORAGE DEVICE

BACKGROUND OF THE INVENTION

1. Field of the Invention

This invention relates in general to communication systems and in particular to a device for storing communications cable.

2. Description of the Related Art

Fiber optic cables are utilized in communications systems for carrying information between communication sources and sinks. An example of a communications system that utilizes fiber optic cable is an optical cross connect for a communications network.

Fiber optic cable typically includes at least one glass core for optical, high bandwidth transmission of information. Typically, fiber optic cable requires a minimum bending radius (e.g., a one-inch bending radius) to avoid damaging the glass core and to avoid producing a large dB loss in the transmission of information through the cable.

Improper handling of fiber optic cable during shipment and installation can damage the cable. Twists or kinks in the cable can cause microcracks, which over time can propagate in the cable and decrease the reliability and longevity of the system and result in costly field repairs and replacements.

Carriers are utilized in some communication systems for supporting fiber optic cable during manufacture, shipment, and installation. An example of a carrier is an 8×8 perfect shuffle carrier, which holds two sets of eight, 8-fiber ribbon cables where each fiber of each cable of the first set is optically coupled to a fiber of a cable of the second set to implement a perfect shuffle optical flex circuit. Such a shuffle may be implemented with splices that are held in the carrier. In one example, the splices are made in the factory to reduce expenses and manufacturing time and to assure quality. The splices and cable are then shipped in the carrier to a use location, where each cable is coupled to a communications circuit, such as a matrix card. To prevent damage to the cables during shipment and installation, the cable should be stored in an organized fashion while meeting minimum bending radius requirements. Also, the fiber must be stored in a small space to reduce the cost and complexity of shipment and installation.

What is needed is an improved technique for storing cable during shipment and installation.

SUMMARY OF THE INVENTION

It has been discovered that providing a fiber optic cable storage device with multiple cable storage pathways positioned in an outward progression from a hub advantageously provides a device that can store a plurality of cables in an organized manner while meeting minimum bending radius requirements.

In one aspect of the invention, a fiber optic cable storage apparatus includes a panel, a hub located on a first side of the panel, and a plurality of cable guide structures located on the first side of the panel around the hub to define a plurality of cable storage pathways positioned in an outward progression from the hub for at least approximately 180 degrees.

In another aspect of the invention, a method of storing fiber optic cable includes inserting each of a plurality of fiber optic cables into one of a plurality of cable storage pathways positioned in an outward progression from a hub for at least approximately 180 degrees.

In another aspect, the invention includes an apparatus including fiber optic cables. The apparatus further includes a panel, a hub located on a first side of the panel, and a plurality of cable guide structures located on the first side of the panel around the hub to define a plurality of cable storage pathways positioned in an outward progression from the hub for at least approximately 180 degrees. The apparatus also includes a plurality of fiber optic cables with each stored in a cable storage pathway of the plurality.

In another aspect of the invention, a fiber optic cable storage apparatus includes a panel, a hub located on a first side of the panel, and means for defining a plurality of cable storage pathways positioned in an outward progression from the hub for at least approximately 180 degrees.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following sets forth a detailed description of a mode for carrying out the invention. The description is intended to be illustrative of the invention and should not be taken to be limiting.

Figure 1:
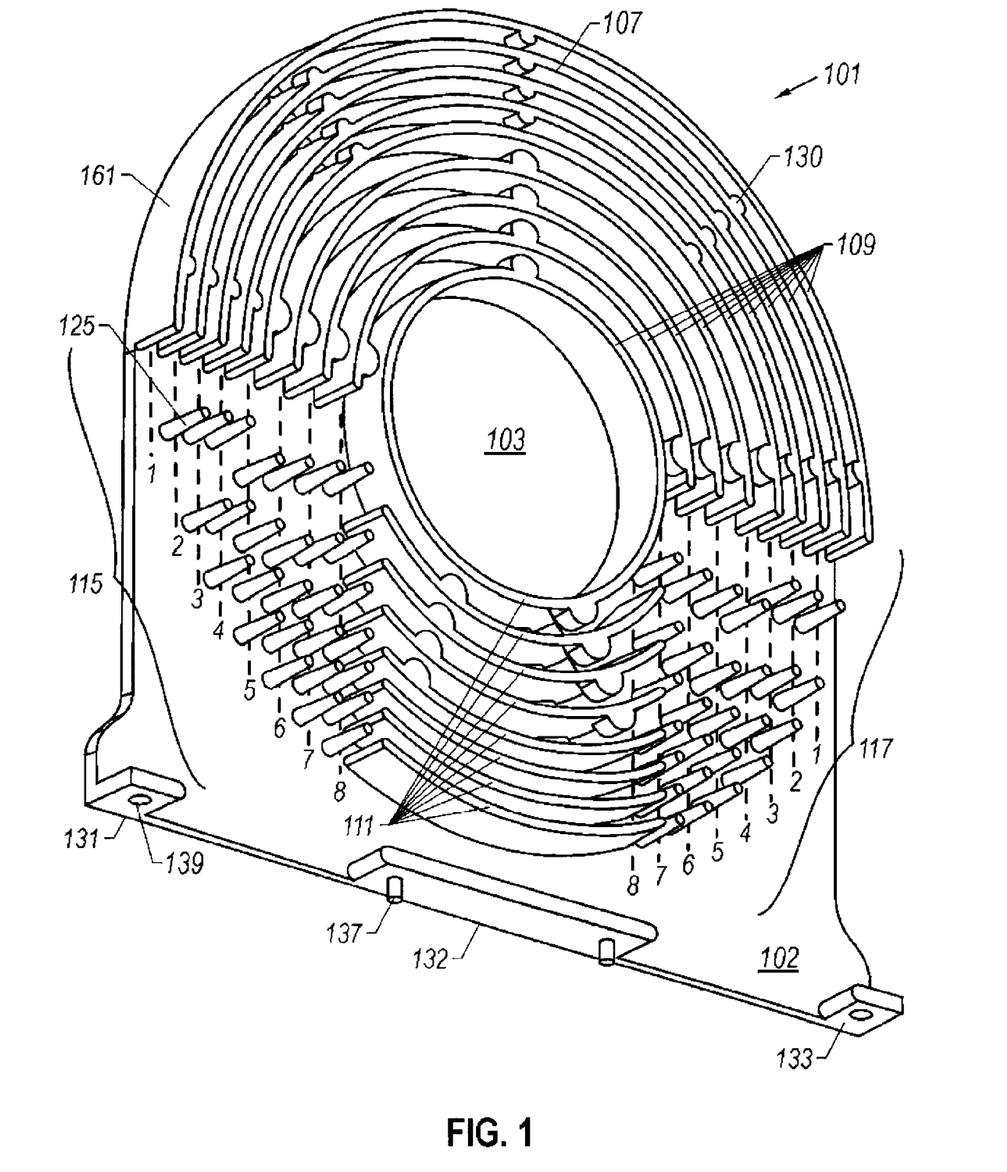
FIG. 1 is a perspective view of an example of a structure for storing a plurality of communications cables according to the present invention.

FIG. 1 is a perspective view of a carrier assembly add-on structure that includes a plurality of cable storage pathways, each for storing at least one communications cable, such as a fiber optic cable. Cable storage wing 101 includes eight cable storage pathways (#1–8) that encircle hub 103 and are arranged in an outward progression completely around hub 103. Cable storage pathway #1 is located outside of cable storage pathways #2–8. The second cable storage pathway is located outside of cable storage pathways #3–8 and so on.

Cable storage wing 101, includes seven discontinuous wall structures 107 positioned concentrically around hub 103 in an outward progression. The discontinuous wall structures 107 each include two sets of circular wall structures, one set 109 is located at the top of storage wing 101 and the other set 111 is located at the bottom of storage device 101, relative to the view shown in FIG. 1. Circular wall structures 109 and 111 are integrally connected to panel 102. An eighth circular wall structure 161 is positioned to encircle the top set 109 of the seven circular wall structures. Located between sets 109 and 111 are two sets of radial gaps 115 and 117. Radial gaps 115 and 117 allow for cables to pass through the outer cable storage pathways to the inner cable storage pathways. Concentrically located in radial gaps 115 and 117 are posts 125, which extend out from panel 102. As will be shown in FIG. 2, posts 125 define portions of the cable storage pathways in radial gaps 115 and 117 and also define the cable entry pathways leading to the cable storage pathways. In FIG. 1, posts 125 have a truncated cone form for structural integrity. The seven cable entry pathways that run through each set of radial gaps 115 and 117 are numbered #2–8 in FIG. 1 with the adjacent dashed lines illustrating the direction of entry of a cable to the respective cable storage pathway.

Containment fingers 130 are integrally connected to circular wall structures 107. Containment fingers 130 act to keep cables within the cable storage pathways. In other embodiments, other types of containment structures may be utilized such as e.g. an overhanging rim integrally connected to a wall structure, fingers that snap open and closed for cable entry, and removable fingers that snap in place bridging two adjacent wall structures. Cable storage wing 101 includes lips 131, 132, and 133 integrally connected at the edge of panel 102. Alignment post structures 137 are located on lip 132 and holes 139 are located on lips 131 and 133 for attaching wing 101 to another structure such as a carrier (e.g., 402 in FIG. 4).

Figure 2:
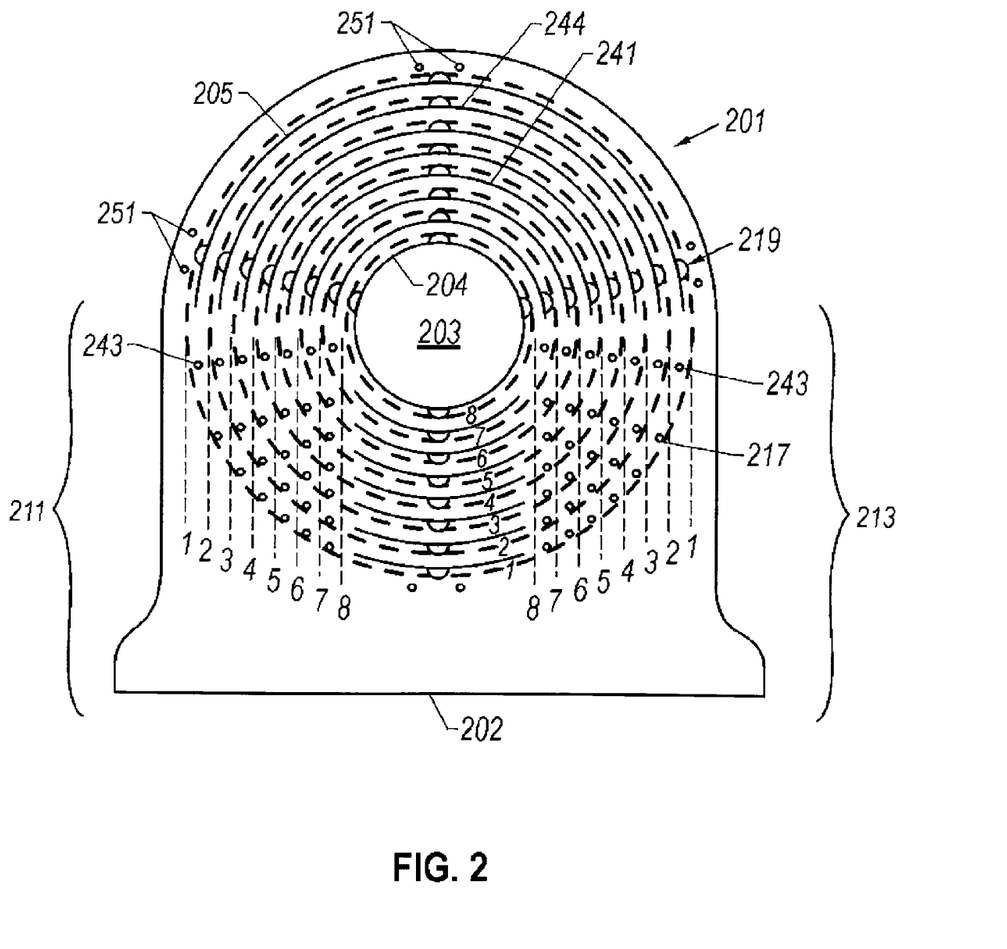
FIG. 2 is a side view of an example of a structure for storing a plurality of communications cables according to the present invention.

FIG. 2 is a side view of another embodiment of a cable storage wing according to the present invention. Cable storage wing 201 includes 7 sets of discontinuous wall structures 205 concentrically positioned in an outward progression from hub 203, which in the embodiment of FIG. 2, includes a ring wall structure 204. Integrally connected to discontinuous wall structures 205 and ring wall structure 204 are containment fingers 219. Discontinuous wall structures 205 include two sets of radial gaps 211 and 213. Located in radial gaps 211 and 213 are posts 217. Posts 217. discontinuous wall structures 205, containment fingers 219, and ring wall structure 204 are integrally formed with panel 202.

Discontinuous wall structures 205, ring wall structure 204, posts 251, and posts 217 define eight cable storage pathways (shown with the long dashed lines in FIG. 2) that are concentrically positioned around hub 203 in an outward progression. Posts 217 also define cable entry pathways to the cable storage pathways. The cable entry pathways are shown in the short dashed lines in FIG. 2. The cable entry pathways for a particular cable storage pathway cross through the cable storage pathways located outside the particular cable storage pathway in the outward progression. For example, the cable entry pathways for cable storage pathway 7 (the second innermost cable storage pathway) passes through the cable storage pathways 1–6.

In the embodiment shown, the number of posts in the cable entry radial gap (211 or 213) of a particular discontinuous wall structure (205) is equal to the number of cable storage pathways located inside of the particular discontinuous wall structure. For example. three cable storage pathways (#6–8) are located inside of the third innermost discontinuous wall structure 241. Accordingly, each radial gap 211 and 213 for discontinuous wall structure 241 includes three posts 217.

With other embodiments, each radial gap would include the number of post equal to one minus the number of cable entry pathways passing through the radial gap. For example, in this alternative embodiment, the cable entry radial gap for the fifth inner most discontinuous wall structure would surround five cable storage pathways (#4–8) and accordingly, would include four posts. In these embodiments, the top circular wall structures 244 of each discontinuous wall structure 205, would extend to the locations of the posts in post rows 243 of cable entry gaps 211 and 213. However, other cable storage devices of the present invention may include more posts.

The cable entry paths #1–8 are designed such that they are generally parallel to each other. However, with other embodiments, the cable entry paths may have other forms and may be at other angles. For example, in some embodiments, the cable entry paths are perpendicular to each other.

In other embodiments, a cable storage device may have other forms, shapes, and other types of guide structures. For example, in one embodiment, the cable storage paths, cable entry paths, and hub are partially or entirely defined with posts. Also with other embodiments, the cable storage paths may have other forms as well such as, e.g., oval, oblong, egg, figure eight, or other shape. Furthermore, with other embodiments, some or all of the cable paths may not completely encircle the hub. With these embodiments, cables stored in these pathways would not be required to be looped around the hub.

In FIGS. 1 and 2, hubs 103 and 203, respectively, are circular and have a 2" diameter. With other embodiments, the hub may have different diameters. However, the hub must have a diameter that meets the bending radius requirements of the cable being stored in the add-on structure. In other embodiments, the hub may have different forms as well.

An advantage of the cable storage devices of FIG. 1 and FIG. 2 is that cables in the inner cable storage pathways may be looped multiple times in the pathway wherein cables in the outer cable pathways may have lesser loops (or none at all) due to the longer length of the outer cable storage pathways.

Another advantage of the cable storage devices of FIG. 1 and FIG. 2 is that the crossover points for each cable pathway are kept separate. Keeping the crossover points separate reduces the stress concentration factor and reduces the weight of the cables on the stress concentration point, thereby increasing the reliability of the cables.

Maintaining the outward progression of the cable paths from the hub for at least 180 degrees enables the cable strands to be separately stored in the device thereby allowing for an easier and more secure method of storing cable for shipment and installation. Allowing cables to be stored separately allows for cables having different excess lengths to be stored in the same structure. For example, depending upon the path that a cable leg takes to the cable storage wing, some cable legs of a set may have more excess cable to be stored than others. Consequently, the ability to individually store cable allows for more cable to be stored from some legs than for others. Another advantage of individually storing excess cable is that during installation, the other legs can remain stored while one leg is being installed. This advantage is especially important when the cable being stored includes optical fiber, which can easily be damaged if left dangling or improperly supported.

In one embodiment, add-on structures 101 and 201 are integrally formed from a plastic resin material such as, e.g., GE resin CYCOLOY C2800. With other embodiments, an add-on structure according to the present invention may be made of other material such as, e.g., metal, wood, or other types of plastics. Also with other embodiments, an add-on structure may be made of separately formed components.

Referring back to FIG. 2, to store a plurality of cable in add-on structure 201, typically each cable is individually inserted into a cable storage pathway (#1–8). With one cable storage technique, the cables are inserted into the cable storage pathways from the inside out, where a cable is inserted into the inner cable storage pathway #8 first, #7 pathway second, etc. With this inside out technique, cable stored in a particular outer cable storage pathway only passes over one layer of cable entering or exiting the inwardly located cable storage pathways. See FIG. 3. For example, a cable looped in cable storage pathway #2 would pass over each cable entering cable storage pathways #3–8 at radial gap 211 and at radial gap 213.

Cable can also be installed with an outside-in technique where cable is installed in the outer cable storage paths first. With this technique, cable entering the inner cable storage pathways would pass over the cable stored in the outer storage pathways. For example, a cable entering cable storage pathway #7 would pass over cable previously installed in cable pathways #1–6.

Whichever technique is utilized to insert the cable in the cable storage pathways, the opposite technique would then be used to remove the cable from the add-on structure 201. For example, if a cable is inserted in cable path #8 first, then it is the last cable to be removed.

Figure 3:
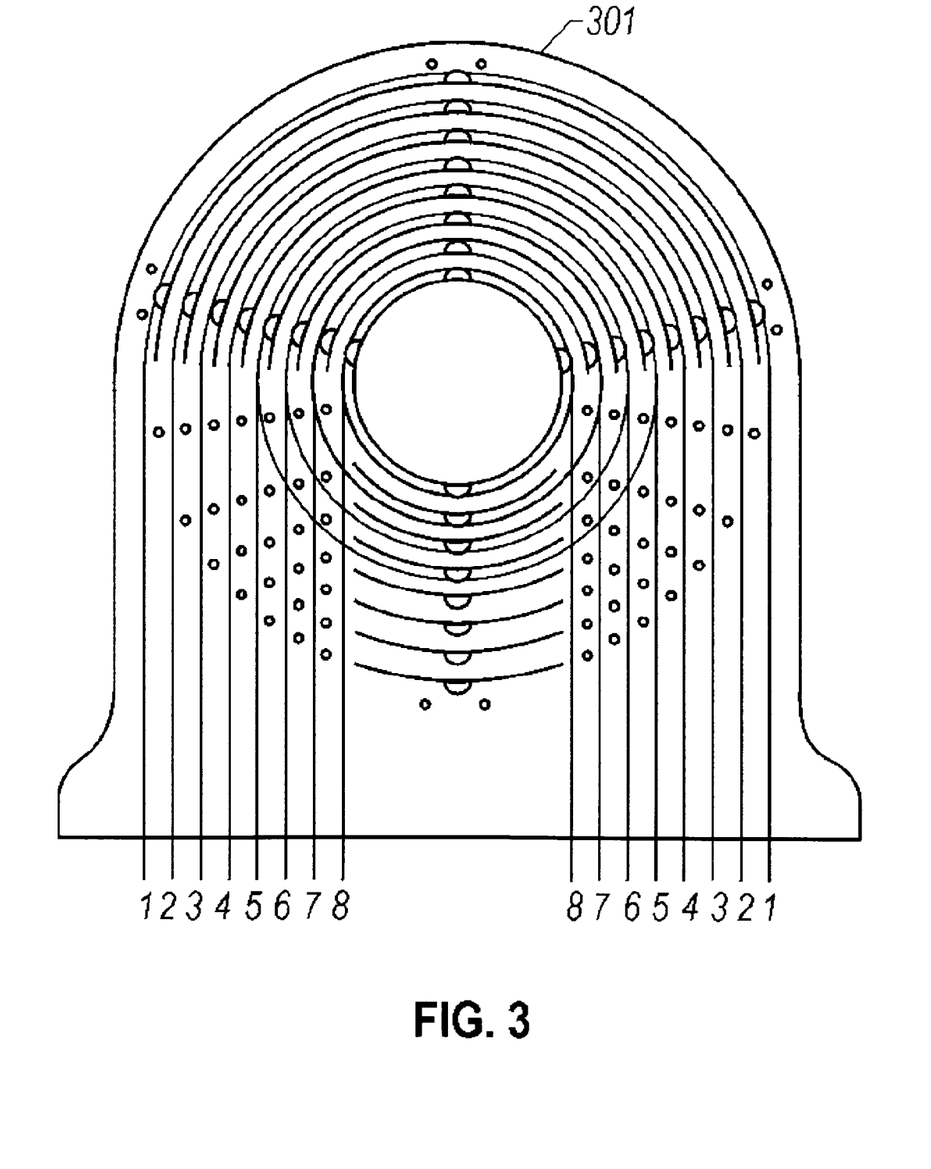
FIG. 3 is a side view of an example of a structure for storing a plurality of communications cables according to the present invention.

FIG. 3 is a side view of an add-on structure 301 having cable being stored in its storage paths. Cables #8, #7, #6, and #5 are looped in the 4 inner cable paths, respectively. Cables #1, #2, #3, and #4 are stored in the four outer cable paths respectively, but are not looped.

Figure 4:
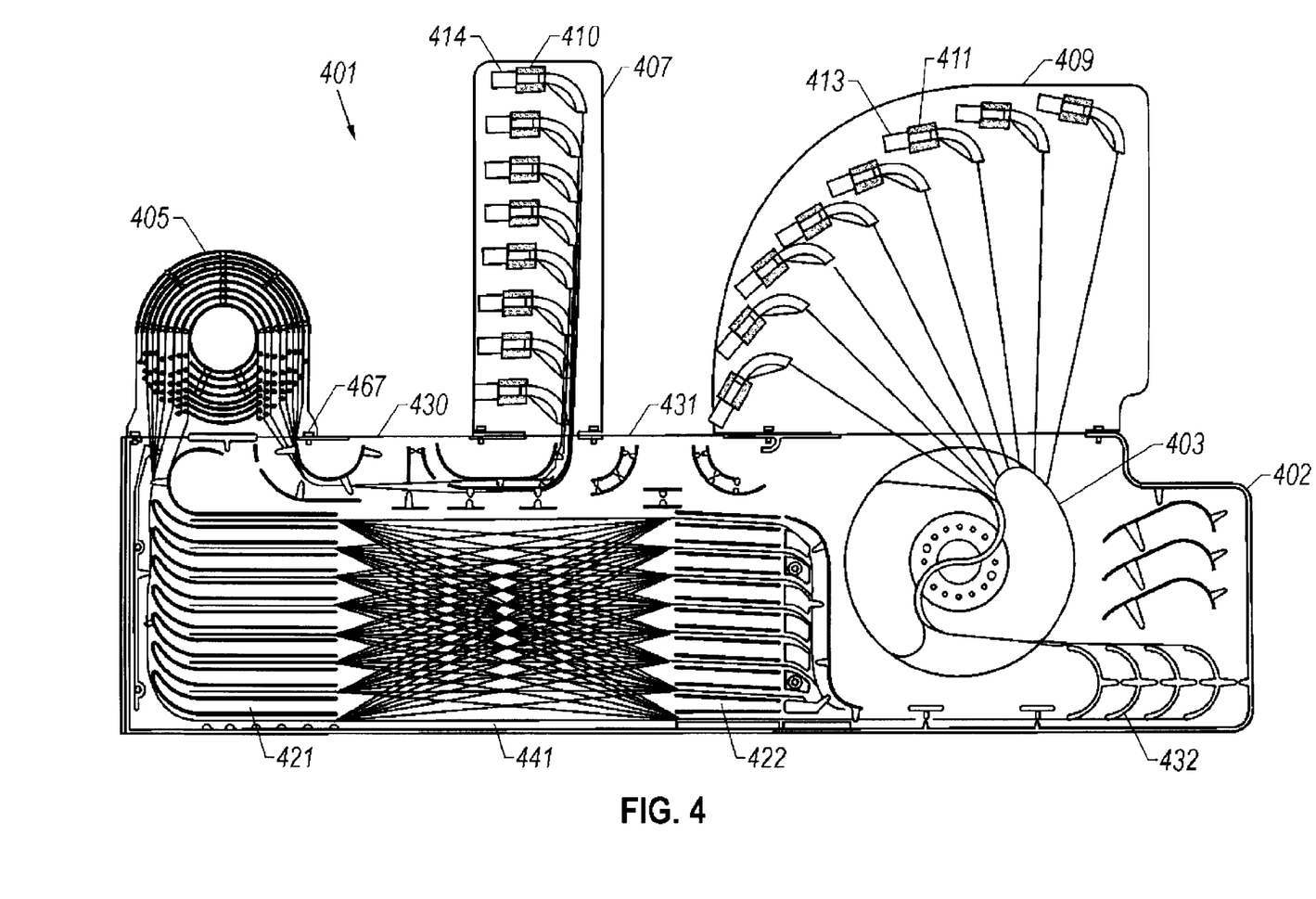
FIG. 4 is a side view of an example of a fiber optic carrier assembly according to the present invention.

FIG. 4 is a side view of a carrier assembly according to the present invention. Carrier assembly 401 is utilized to ship and install an 8×8 perfect shuffle optical flex circuit. Carrier assembly 401 includes a cable storage wing 405 similar to that of cable storage wing 101.

Carrier assembly 401 includes a carrier 402 and a spool 403 attached to carrier 402. Spool 403 is utilized to store excess fiber optic cable. A further explanation of spool 403 can be found in a patent application entitled "Fiber Optic Cable Spool," having listed inventors Gordon C. Harrison and Michael A. Mandry, having a common assignee and filing date, all of which is incorporated by reference in its entirety.

Also attached to carrier 402 are connector storage wings 407 and 409. Storage wings 407 and 409 each include eight integral clips 410 and 411, respectively, for securing multiple fiber, optical connectors 414 and 413, respectively, to the storage wings, thereby protecting the cables from damage during shipment. An example of a multiple fiber optical connector is an MPX connector sold by AMP INC. A further explanation of storage wings 407 and 409 can be found in a patent application entitled "Fiber Optic Connector Clip," having listed inventor Michael A. Mandry, and having a common assignee and filing date, all of which is incorporated by reference in its entirety.

Carrier 402 includes cable paths and cable holders for holding two sets of eight, 8-fiber ribbon cable legs. Each leg of the first set of cable legs is terminated with one of connectors 414. The first set of cable legs is routed from rotational translation and oscillation damping fusion splice holders 421, through cable storage wing 405, where excess slack of the first set is stored, to storage wing 407. Each leg of the second set of cable legs terminates at one of connectors 413 secured to a clip 411 of connector storage wing 409. The cable legs of the second set are routed from rotational translation and oscillation damping fusion splice holders 422, through arc structures 432, through spool 403 where excess slack in the second set is stored, to storage wing 409. At the interior edge of splice holders 421 and 422, the eight fibers of each leg of the first and second sets, respectively, are each spliced to a fiber of an optical flex circuit main body 441 to implement a perfect shuffle optical flex circuit. In one embodiment, the optical flex circuit main body is encapsulated in a laminate (not shown). In one embodiment, the cable legs of the first set are one meter in length and the cable legs of the second set are nine meters in length. In one embodiment, after the cable legs and connectors are secured in carrier assembly 401 (as shown in FIG. 4) and the fibers of the cable legs are spliced to the fibers of optical flex circuit main body 441. carrier assembly 401 is encased in STYROFOAM™ or other protective packaging to protect the fiber optic cable during shipment.

Prior to installing cable on carrier assembly 401, wings 405, 407, and 409 are attached to carrier 402 with plastic rivets 467 inserted through holes (e.g., 139) in lips (e.g., 131) of wings 405, 407, and 409 and through holes in the lips of carrier 402. Rivets 467 allow for quick installation and removal of the wings with sufficient holding force for shipping and installation. In some embodiments, the rivets are reusable. Examples of rivets are the SRHVO-3570 and the SRHVO-3080 Snap Rivets, H-type sold by RICHCO. In one embodiment, wings 405, 407, and 409 are made of the same material (e.g., a plastic resin) as carrier 402.

Carrier assembly 401 allows for fiber optic cable legs and connectors 413 and 414 to be shipped securely to a use location, thereby reducing the risk of damage to the fiber optic cores. Carrier assembly is also used to transport the optic flex circuit from an assembly cell to an optic testing cell, and then to a packaging/shipping cell during manufacture.

Figure 5:
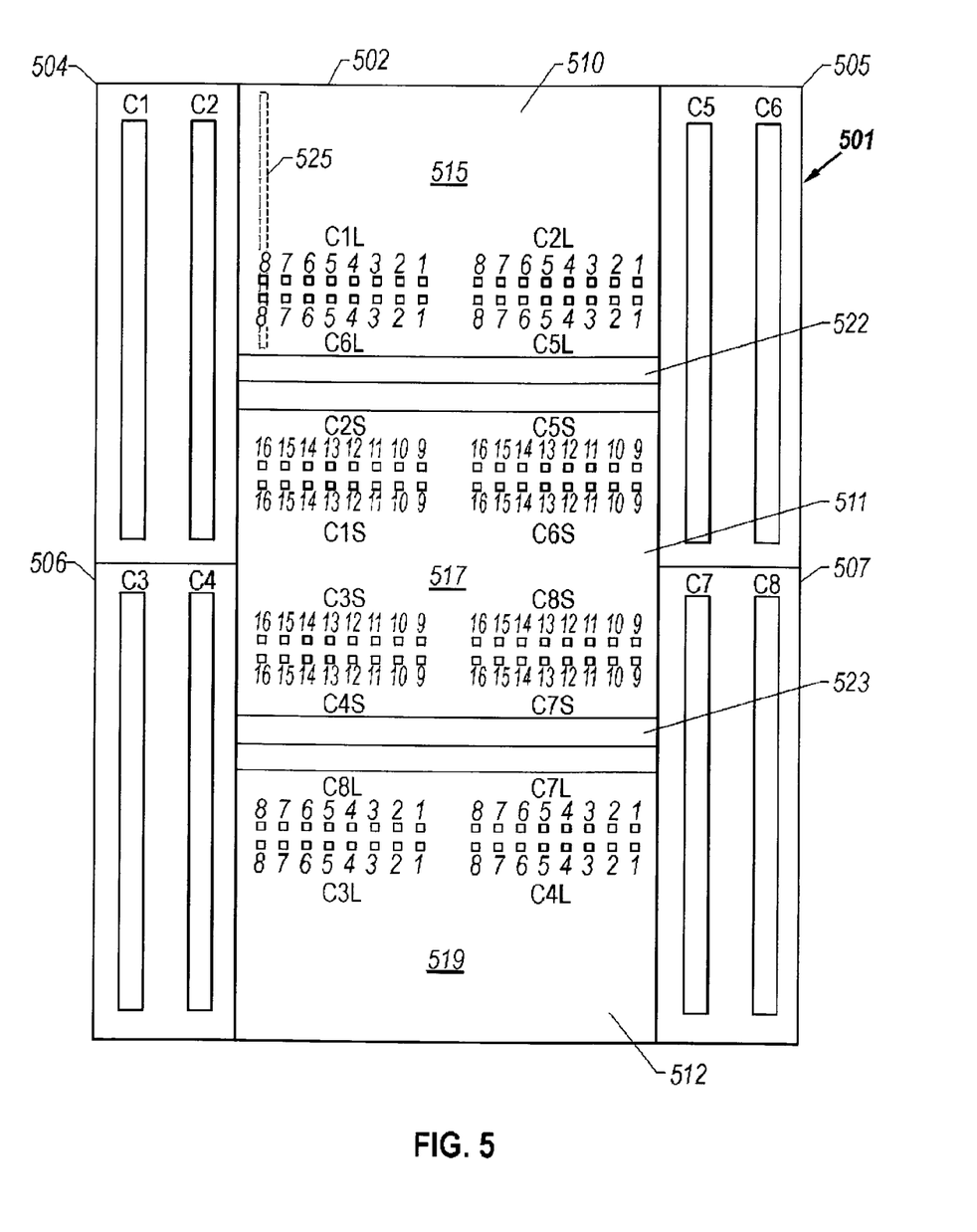
FIG. 5 is a rear view of an example of a communication system cabinet according to the present invention.

FIG. 5 shows a rear view of a matrix bay for a communication system. In one embodiment, matrix bay 501 is utilized in a wavelength router-class, optical cross connect. A wavelength router-class optical cross connect typically provides infrastructure class intelligent intercouplability between several optical signals which can be switched electronically to couple any two of the optical signals. In one embodiment, the system receives up to 4,096 1+1 optical signals. The system may have numerous redundancy protection schemes such that in the event of an isolated equipment failure, alternate paths for the optical signals will be automatically utilized to assure continuous couplability. Due to its nature, a wavelength router-class optical cross connect includes a multitude of fiber optic cables.

Matrix bay 501 includes four matrix side chassises, 504, 505, 506, and 507. Shown located in matrix side chassis 504 are carriers C1 and C2. Shown located in matrix side chassis 505 are carriers C5 and C6. Shown located in matrix side chassis 506 are carriers C3 and C4, and shown located in matrix side chassis 507 are carriers C7 and C8. Each of the carriers C1–C8 implement an 8×8 perfect shuffle optical flex circuit similar to the one shown in FIG. 4. Up to eight carriers may be housed in each matrix side chassis. Matrix bay 501 includes 3 matrix card chassises 510, 511, and 512. Located in matrix card chassises 510, 511, and 512 are backplanes 515, 517, and 519. respectively. Mounted in the backplanes are connectors (designated 1–16) that are compatible with the connectors (e.g., 413 and 414) that terminate the cables originating from carriers (C1–C8). In some embodiments, matrix bay 501 includes a rear door (not shown).

The connectors mounted in matrix card chassises 510, 511, and 512 are operably coupled to matrix cards (not shown) located behind backplanes 515, 517, and 519, respectively. Matrix card 525 is shown in phantom in FIG.

5. Other matrix cards are similarly orientated behind backplanes 515, 517, and 519. Each carrier includes an 8×8 perfect shuffle that enables each of a first set of eight matrix cards to be coupled to each of a second set of eight matrix cards.

When the carriers are operably installed in the matrix side chassises, the connectors (e.g.. 413 and 414) from each of the carriers (C1–C8) are connected to one of the connectors mounted on backplanes 515, 517, or 519. For example, the connectors that terminate the long cable legs of carrier C1 are connected to connectors C1L1–C1L8 mounted to backplane 515 in matrix card chassis 510. The connectors that terminate the short cable legs of carrier C1 are connected to connectors C1S9–C1S16, which are mounted to backplane 517 of matrix card chassis 511. In the embodiment shown, all of the short cable legs from each carrier are coupled to connectors mounted to backplane 517 in middle matrix card chassis 511. In other systems, each matrix card chassis may include a greater or lessor number of connectors, depending upon the capacity of the system. With some systems, the matrix card bays include 16 connectors for each carrier slot in a matrix side chassis. With one embodiment, the matrix side chassises have a capacity of housing 32 carriers wherein the matrix card bays have 780 optical connectors, with 520 of the optical connectors dedicated to the cables of the carriers.

Referring back to FIG. 4, carrier 402 includes two cable paths 430 and 431. When the carrier is operably installed in a matrix side chassis (e.g., 504), cable exits the carrier via cable path 430 or 431, wherein the cables of the carrier are connected to corresponding connectors housed in matrix card chassises 510, 511, or 512. Cable paths 430 and 431 are located on the edge of carrier 402 that faces outward from a matrix side chassis (e.g., 506) when carrier 402 is installed in the matrix side chassis. After exiting a cable path (e.g., 431 or 430), the cable legs are routed through cable trays (e.g., 522 and 523) to their appropriate connectors in the matrix card bays. In FIG. 5, the cables extending from carriers C1–C8 are not shown for simplicity of the drawing.

Figure 6:
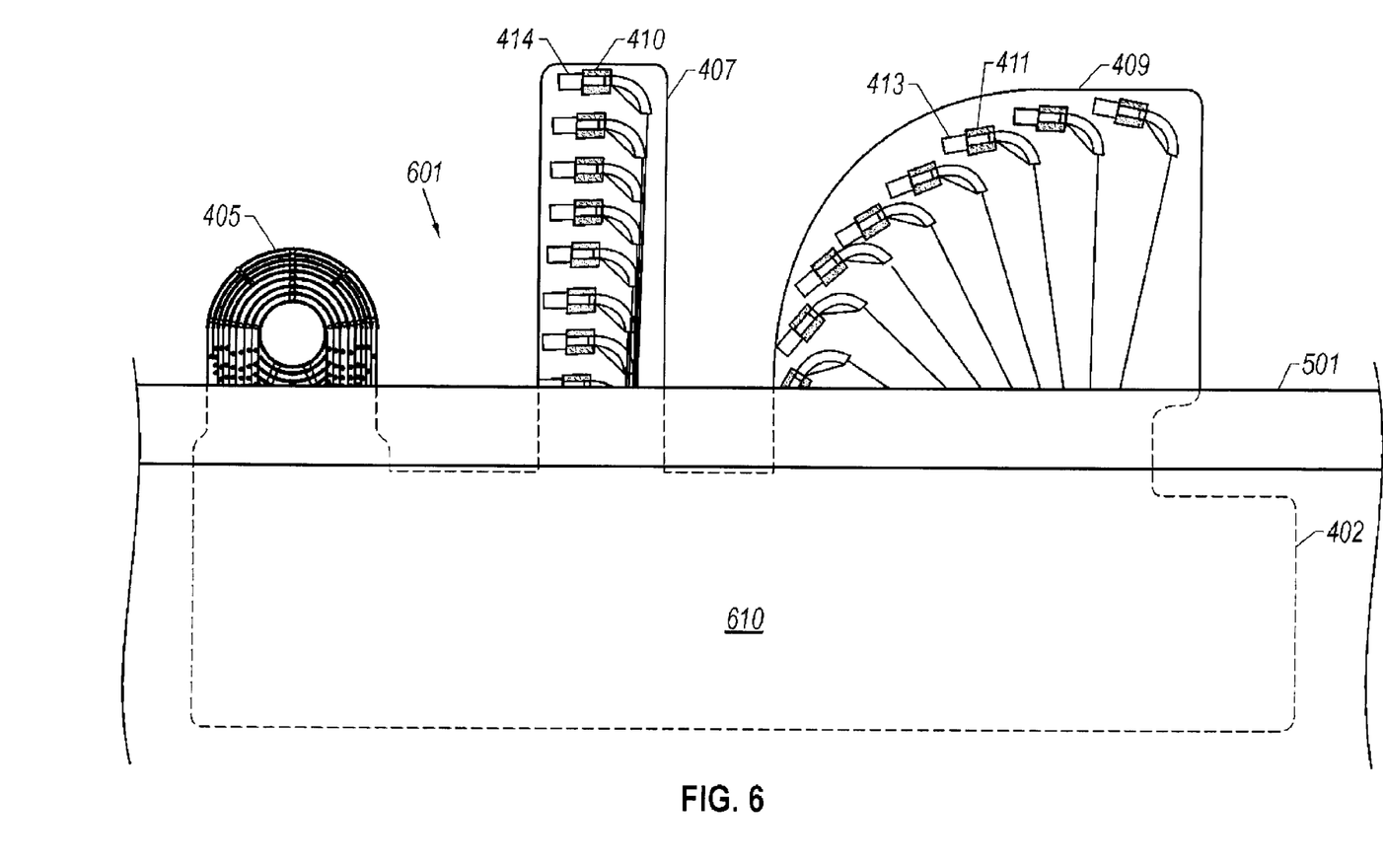
FIG. 6 is a partial side view of an example of a communication system cabinet according to the present invention. The use of the same reference symbols in different drawings indicates identical items unless otherwise noted.

FIG. 6 shows a partial side view of matrix bay 501. To operably install carrier 402 in matrix bay 501, carrier assembly 401 is installed in a matrix side chassis (e.g., 504) such as in the position shown in FIG. 6. In FIG. 6 a portion of carrier assembly 401 located behind side wall 610 is shown in phantom.

After carrier assembly 401 is installed in the matrix side chassis, each of the connectors 413 are removed from clips 411 and connected to the appropriate connector (one of connectors C1L–C8L) of matrix card chassis 510 or 512. In connecting end connector 413 to a connector in one of the matrix card chassises (e.g., 510 or 512), the fiber optic cable leg attached to the connector is routed out from carrier 402 via cable path 430 or 431 and through one of the cable trays (522 or 523) to the appropriate connector.

Each of the connectors 414 are removed from clips 410 and connected to the appropriate connector (one of connectors C1S–C8S) of matrix card chassis 511. In connecting end connector 414 to a connector in matrix card chassis 511, the fiber optic cable leg attached to the connector is first individually removed from its respective cable path of cable storage wing 405 and then routed out from carrier 402 via cable path 430 or 431 and through one of the cable trays (522 or 523) to the appropriate connector. When all connectors 413 and 414 of carrier 402 are connected to the connectors of the matrix card chassises, wings 405, 407, and 409 are removed from the carrier by removing plastic rivets 467.

Providing a carrier assembly with removably attachable wings (e.g., 405, 407, and 409) provides a convenient holding structure for each of the cable legs and corresponding connectors. Consequently during installation, the individual cable legs are not left dangling while other cable legs of the carrier are being installed.

Furthermore, in the event that repairs are needed to be made to matrix bay 501, wings 405, 407, and/or 409 can be reattached to carrier 402 so that when connectors 413 and 414 are being removed for repair, they can be secured to clips 410 and 411 of wings 409 and 407, respectively, and so that the cable legs can be stored in cable storage wing 405, thereby preventing damage to the cable legs during a repair operation.

Those of skill in the art will recognize that, based upon the teachings herein, several modifications may be made to the embodiments shown in FIGS. 1–6. For example, a fiber optic cable storage device with multiple cable storage pathways may have different sizes and/or forms. Also, a cable storage device with multiple cable storage pathways may be implemented on other structures such as on a fiber optics carrier (e.g., 402) or other structures of a communications device. Furthermore, other types cables of communications cable may be stored in a fiber optic cable storage device with multiple cable storage pathways.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A fiber optic cable storage apparatus comprising:
   a panel;
   a hub located on a first side of the panel;
   a plurality of cable guide structures located on the first side of the panel around the hub to define a plurality of cable storage pathways positioned in an outward progression from the hub for at least approximately 180 degrees wherein,
   the plurality of guide structures further include a plurality of a discontinuous wall structures positioned concentrically around the hub in an outward progression to define at least portions of the cable storage pathways,
   each discontinuous wall structure defines a cable entry radial gap,
   the plurality of guide structures further include a plurality of posts located in cable entry radial gaps of the discontinuous wall structures of the plurality,
   at least one cable entry pathway passes through the cable entry radial gap for each of the discontinuous wall structures of the plurality,
   the number of posts located in the cable entry radial gap of a discontinuous wall structure is equal to at least one less than the number of cable entry pathways passing through the cable entry radial gap of the discontinuous wall structure.

2. The apparatus of claim 1 wherein at least three of the plurality of cable storage pathways are positioned completely around the hub in an outward progression.

3. The apparatus of claim 1 wherein the plurality of guide structures define two cable entry pathways for each of the plurality of cable storage pathways.

4. The apparatus of claim 3 wherein the for at least two of the inner most cable storage pathways of the plurality, the cable entry pathways extend through at least one cable storage pathway located outside of the inner cable storage pathway in an outward progression.

5. The apparatus of claim 3 wherein the plurality of guide structures further include a plurality of posts located on the first side of the panel, at least some of the posts of the plurality of posts defining portions of the cable entry pathways for at least some of the cable storage pathways, at least some of the posts of the plurality defining portions of at least some of the cable storage pathways.

6. The apparatus of claim 3 wherein the cable entry pathways for each of the plurality of cable storage pathways are located on opposite sides of the hub and have a generally parallel direction with each other.

7. The apparatus of claim 1 wherein the plurality of cable guide structures further include a plurality of discontinuous wall structures positioned in an outward progression from the hub to define at least portions of the plurality of cable storage pathways.

8. The apparatus of claim 7 wherein each of the plurality of the discontinuous wall structures encircle the hub and encircle innerwardly positioned discontinuous wall structures of the plurality.

9. The apparatus of claim 1 further comprising:
a plurality of fingers extending from ends of the discontinuous wall structures opposing the panel, the fingers extending over the cable storage pathways.

10. The apparatus of claim 1 wherein:
each of the plurality of discontinuous wall structures defines at least one radial gap;
the plurality of guide structures further includes at least one post structure concentrically located in a radial gap of the at least one radial gap of each discontinuous wall structure of the plurality.

11. The apparatus of claim 1 wherein the hub has an outer surface that defines a side of an innermost cable storage pathway of the plurality, wherein the surface has a radius of at least approximately 1 inch.

12. The apparatus of claim 1 wherein the fiber optic cable storage apparatus is made out of a plastic resin material.

13. The apparatus of claim 1 wherein the panel, hub, and cable guide structures are integrally coupled.

14. The apparatus of claim 1 wherein the hub includes a continuous ring wall structure.

15. The apparatus of claim 1 further comprising:
at least one attachment device located at an edge of the panel for attaching the panel to another structure.

16. The apparatus of claim 1 wherein the plurality of cable storage pathways includes at least eight cable storage pathways.

17. The apparatus of claim 1 further comprising:
a fiber optic carrier coupled to the panel, the carrier including structures defining at least one cable pathway to provide cables extending to the plurality of cable pathways.

18. A method of storing fiber optic cable comprising:
inserting each of a plurality of fiber optic cables into one of a plurality of cable storage pathways positioned in an outward progression from a hub for at least approximately 180 degrees, wherein
a plurality of a discontinuous wall structures defines the plurality of cable storage pathways,
each discontinuous wall structure defines a cable entry radial gap,
the plurality of guide structures further include a plurality of posts located in cable entry radial gaps of the discontinuous wall structures of the plurality,
at least one cable entry pathway passes through the cable entry radial gap for each of the discontinuous wall structures of the plurality,
the number of posts located in the cable entry radial gap of a discontinuous wall structure is equal to at least one less than the number of cable entry pathways passing through the cable entry radial gap of the discontinuous wall structure.

19. The method of claim 18 wherein the inserting further includes wrapping around the hub at least some of the plurality of fiber optic cables in cable storage pathways of the plurality that encircle the hub.

20. The method of claim 18 wherein the inserting further includes inserting each of the fiber optic cables of the plurality in one of a plurality of a cable entry pathways for the cable storage pathway of the plurality that the cable is inserted therein.

21. The method of claim 18 wherein the inserting further includes inserting each of some of the fiber optic cables of the plurality through at least one outer cable storage pathways of the plurality to an inner cable storage pathway of the plurality.

22. The method of claim 18 wherein the hub is connect to an add-on structure, the method further comprising:
attaching the add-on structure to a carrier prior to the inserting.

23. The method of claim 22 further comprising:
shipping the add-on structure, the hub, the plurality of cables, and the carrier to an end use location.

24. The method of claim 23 further comprising:
individually removing, at the end use location, each cable of the plurality from a cable storage path of the plurality.

25. The method of claim 23 wherein the fiber optic cable is multi-fiber cable.

26. An apparatus including fiber optic cables comprising:
a panel;
a hub located on a first side of the panel;
a plurality of cable guide structures located on the first side of the panel around the hub to define a plurality of cable storage pathways positioned in an outward progression from the hub for at least approximately 180 degrees, wherein the plurality of cable guide structures defines the plurality of cable storage pathways, the plurality of cable guide structure further includes
a plurality of a discontinuous wall structures,
each discontinuous wall structure defines a cable entry radial gap,
the plurality of guide structures further include a plurality of posts located in cable entry radial gaps of the discontinuous wall structures of the plurality,
at least one cable entry pathway passes through the cable entry radial gap for each of the discontinuous wall structures of the plurality,
the number of posts located in the cable entry radial gap of a discontinuous wall structure is equal to at least one less than the number of cable entry pathways passing through the cable entry radial gap of the discontinuous wall structure; and
a plurality of fiber optic cables,each stored in a cable storage pathway of the plurality.

27. The apparatus of claim 26 wherein at least some of the cable storage pathways of the plurality encircle the hub, wherein at least some of the cables of the plurality are wrapped at least once around the hub in a cable storage pathway of the plurality that encircles the hub.

28. The apparatus of claim 26 wherein each of the fiber optic cables of the plurality is a multi-fiber cable.

29. The apparatus of claim 26 further comprising:
a carrier removably coupled to the panel, the plurality of cables including portions secured in the carrier, each of the plurality of cables extending out from the carrier to a cable storage path of the carrier.

30. The apparatus of claim 29 wherein the cables of the plurality enter and exit the cable storage pathways of the plurality from the carrier on opposite sides of the hub in generally parallel directions.

31. The apparatus of claim 26 wherein the plurality of cable guide structures further include a plurality of discontinuous wall structures positioned in an outward progression from the hub to define at least portions of the plurality of cable storage path ways.

32. The apparatus of claim 31 wherein each of the plurality of the discontinuous wall structures encircle the hub and encircle innerwardly positioned discontinuous wall structures of the plurality.

33. The apparatus of claim 26 wherein the plurality of guide structures further include a plurality of posts located on the first side of the panel, at least some of the posts of the plurality of posts defining portions of the cable entry pathways for at least some of the cable storage pathways, at least some of the posts of the plurality defining portions of at least some of the cable storage pathways.

34. An apparatus for storing fiber optic cable comprising:
means for inserting each of a plurality of fiber optic cables into one of a plurality of cable storage pathways positioned in an outward progression from a hub for at least approximately 180 degrees, wherein
a plurality of a discontinuous wall structures defines the plurality of cable storage pathways,
each discontinuous wall structure defines a cable entry radial gap,
the plurality of guide structures further include a plurality of posts located in cable entry radial gaps of the discontinuous wall structures of the plurality,
at least one cable entry pathway passes through the cable entry radial gap for each of the discontinuous wall structures of the plurality,
the number of posts located in the cable entry radial gap of a discontinuous wall structure is equal to at least one less than the number of cable entry pathways passing through the cable entry radial gap of the discontinuous wall structure.

35. The apparatus of claim 34 wherein the inserting further includes
means for wrapping around the hub at least some of the plurality of fiber optic cables in cable storage pathways of the plurality that encircle the hub.

36. The apparatus of claim 34 wherein the inserting further includes
means for inserting each of the fiber optic cables of the plurality in one of a plurality of a cable entry pathways for the cable storage pathway of the plurality that the cable is inserted therein.

37. The apparatus of claim 34 wherein the inserting further includes
means for inserting each of some of the fiber optic cables of the plurality through at least one outer cable storage pathways of the plurality to an inner cable storage pathway of the plurality.

38. The apparatus of claim 34 wherein the hub is connect to an add-on structure, the apparatus further comprising:
means for attaching the add-on structure to a carrier prior to the inserting.

39. The apparatus of claim 38 further comprising:
means for shipping the add-on structure, the hub, the plurality of cables, and the carrier to an end use location.

40. The apparatus of claim 39 further comprising:
means for individually removing, at the end use location, each cable of the plurality from a cable storage path of the plurality.

41. The apparatus of claim 23 wherein the fiber optic cable is multi-fiber cable.

42. A fiber optic cable storage apparatus comprising:
a panel;
a hub located on a first side of the panel;
a plurality of cable guide structures located on the first side of the panel around the hub to define a plurality of cable storage pathways positioned in an outward progression from the hub for at least approximately 180 degrees, wherein the plurality of cable storage pathways includes at least eight cable storage pathways, the plurality of guide structures define at least two cable entry pathways for each of the plurality of cable storage pathways.

43. The apparatus of claim 42 wherein at least three of the plurality of cable storage pathways are positioned completely around the hub in an outward progression.

44. The apparatus of claim 42 wherein the at least two of the inner most cable storage pathways of the plurality, the cable entry pathways extend through at least one cable storage pathway located outside of the inner cable storage pathway in an outward progression.

45. The apparatus of claim 42 wherein the plurality of guide structures further include a plurality of posts located on the first side of the panel, at least some of the posts of the plurality of posts defining portions of the cable entry pathways for at least some of the cable storage pathways, at least some of the posts of the plurality defining portions of at least some of the cable storage pathways.

46. The apparatus of claim 42 wherein the cable entry pathways for each of the plurality of cable storage pathways are located on opposite sides of the hub and have a generally parallel direction with each other.

47. The apparatus of claim 42 wherein the plurality of cable guide structures further include a plurality of discontinuous wall structures positioned in an outward progression from the hub to define at least portions of the plurality of cable storage pathways.

48. The apparatus of claim 42 wherein each of the plurality of the discontinuous wall structures encircle the hub and encircle innerwardly positioned discontinuous wall structures of the plurality.

49. The apparatus of claim 42 wherein the plurality of guide structures further include a plurality of a discontinuous wall structures positioned concentrically around the hub in an outward progression to define at least portions of the cable storage pathways.

50. The apparatus of claim 42 further comprising:
a plurality of fingers extending from ends of the discontinuous wall structures opposing the panel, the fingers extending over the cable storage pathways.

51. The apparatus of claim 49 wherein:
each of the plurality of discontinuous wall structures defines at least one radial gap;

the plurality of guide structures further includes at least one post structure concentrically located in a radial gap of the at least one radial gap of each discontinuous wall structure of the plurality.

52. The apparatus of claim 42 wherein:

each discontinuous wall structure defines a cable entry radial gap;

the plurality of guide structures further include a plurality of posts located in cable entry radial gaps of the discontinuous wall structures of the plurality;

at least one cable entry pathway passes through the cable entry radial gap for each of the discontinuous wall structures of the plurality, the number of posts located in the cable entry radial gap of a discontinuous wall structure is equal to at least one less than the number of cable entry pathways passing through the cable entry radial gap of the discontinuous wall structure.

53. The apparatus of claim 42 wherein the hub has an outer surface that defines a side of an innermost cable storage pathway of the plurality, wherein the surface has a radius of at least approximately 1 inch.

54. The apparatus of claim 42 wherein the fiber optic cable storage apparatus is made out of a plastic resin material.

55. The apparatus of claim 42 wherein the panel, hub, and cable guide structures are integrally coupled.

56. The apparatus of claim 42 wherein the hub includes a continuous ring wall structure.

57. The apparatus of claim 42 further comprising:

at least one attachment device located at an edge of the panel for attaching the panel to another structure.

58. The apparatus of claim 42 further comprising:

a fiber optic carrier coupled to the panel, the carrier including structures defining at least one cable pathway to provide cables extending to the plurality of cable pathways.

* * * * *